UNITED STATES PATENT OFFICE.

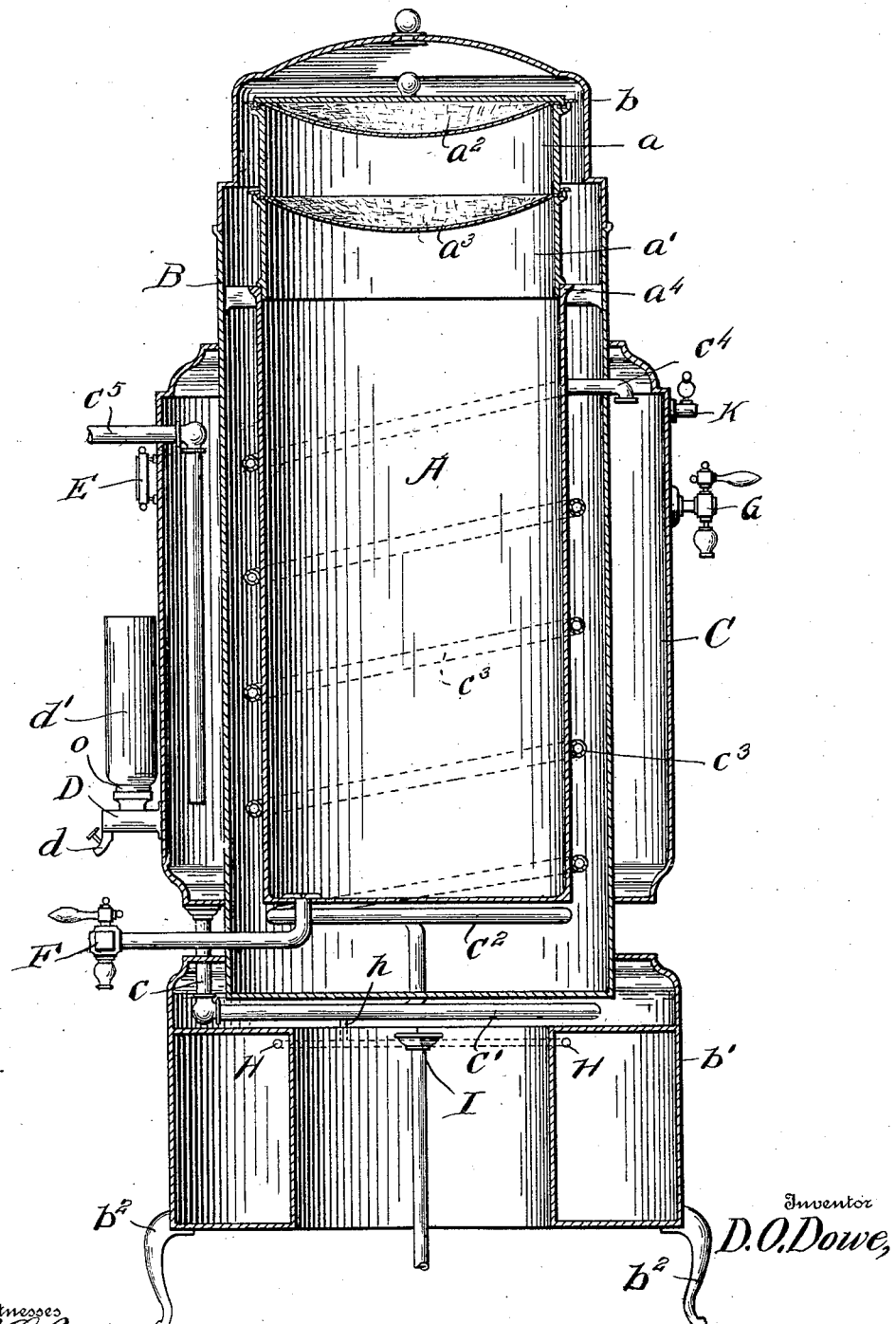

DANIEL O'CONNELL DOWE, OF MONTGOMERY, ALABAMA.

COFFEE-URN.

No. 855,842.        Specification of Letters Patent.        Patented June 4, 1907.

Application filed February 25, 1907. Serial No. 359,262.

*To all whom it may concern:*

Be it known that I, DANIEL O'CONNELL DOWE, a citizen of the United States, residing at Montgomery, in the county of Montgomery and State of Alabama, have invented certain new and useful Improvements in Coffee-Urns, of which the following is a specification.

My invention relates to urns of the same general type as that patented to me on September 11, 1906, by U. S. Patent No. 830,771, and comprises certain new and useful improvements, over the said prior construction, which improvements will be hereinafter distinctly pointed out, reference being had to the accompanying drawing, in which is represented, principally in vertical section, an urn embodying the said improvements.

The improved urn comprises an internal crock or receptacle A, in which the coffee is made and maintained hot, the upper end of the crock having two sections $a$ and $a'$ designed to retain strainer cloths $a^2$ and $a^3$ to support the coffee grains while boiling water is poured on them to make the liquid coffee, in the manner described in my said patent.

The crock A is suspended at its upper edge $a^4$ inside the main shell or body of the urn B, having cover $b$ and base-section $b'$, supported by legs $b^2$, while the main body-portion of the urn B is in turn surrounded by the water-reservoir C, from the bottom of which at one point leads a pipe $c$, which forms a horizontal coil $c'$ in the said base-portion $b'$, then enters B and forms another similar coil $c^2$, under the base of the crock A, passes in helical coils $c^3$ upwardly around A and finally ends at $c^4$ in the upper part of reservoir C, on the opposite side of the urn from that at which it started. Cold water from some suitable source of supply is admitted to reservoir C through pipe $c^5$, the inlet-pipe reaching down adjacent to the point where pipe $c$ leaves said reservoir.

In the portion $b'$, immediately beneath the coil $c'$, a gas or oil-burner I is located, the heat of which is transmitted primarily to the water in the coil $c'$ but also to the water contained in the urn B.

The reservoir C is provided with a thermometer E, a steam blow-off valve K and a hot-water faucet G, through which latter boiling water is withdrawn when fresh coffee is to be made.

Crock A is provided with faucet F through which the coffee is drawn.

The function of the above-described parts is as follows: The urn B is filled with water, the burner I is lighted, and water is turned on at $c^5$ so as to fill the reservoir C as well as the coils $c'$, $c^2$ and $c^3$. As soon as the water in C reaches the boiling-point, some of the boiling-water can be withdrawn through faucet G and poured into a vessel containing the coffee, and thence into crock A through the strainers $a^2$ and $a^3$, the latter of which is finer than the former. The strainers can be removed and washed before being used again, since they are not attached to frame-work of any kind. The coffee thus made is maintained hot by the circulation of hot water in coil $c^3$ and the hot water present in the main-body portion B, it being, of course, unnecessary to heat the water to boiling except when fresh coffee is to be made.

It will be seen that by the arrangement of parts described, I obtain several improved results, notably economy of space and of fuel, owing to the concentric arrangement of the several receptacles, and location of the coils for the hot water.

I have added some further improvements to urns of this class, which I will now describe.

In the base $b'$ I place two semi-circular receptacles for bread, rolls and the like, in which such articles may be kept fresh and hot, said receptacles receiving heat from the adjacent burner I and also containing small perforated pipes H, suitably connected, as at $h$, with the coil $c'$, so that hot water or steam can be sprayed on the bread or rolls, when desired. Again to the outside of reservoir C, I attach an inverted cup D, provided with a faucet $d$, and adapted to receive the neck of an inverted bottle $d'$, containing cream, beef tea, chocolate, or other syrups for hot soda. The top of the cup is prevented with an air-vent, as indicated at $o$, so that each time a part of the contents of the bottle is withdrawn, the remainder is agitated and consequently thoroughly mixed. The proximity of the bottle $d'$ to the reservoir of hot water C, serves to keep the contents of the bottle hot ready for use.

Having thus described my invention, what I desire to claim as my exclusive property is—

1. In an urn of the class described, the combination of a coffee-crock, a main body-portion inclosing said crock and adapted to contain hot water and to be placed over a burner, a water tank or reservoir surrounding said body-portion, and a circulation pipe connected at both ends to said reservoir and being formed into an intermediate coil beneath said body-portion and also into a second coil surrounding said crock.

2. In an urn of the class described, the combination of a coffee-crock, a main body-portion inclosing said crock and adapted to contain hot water and to be placed over a burner, a water tank or reservoir surrounding said body-portion, and a circulation pipe connected at both ends to said reservoir and including one coil beneath said body-portion, a second coil beneath said crock and a helical coil surrounding the latter.

3. In an urn of the class described, the combination of a coffee-crock, a main body-portion, inclosing said crock and adapted to contain hot water and to be placed over a burner, a water tank or reservoir surrounding said body-portion, a supply-pipe for said reservoir, a coil of pipe beneath said body portion and connected to said reservoir, a second coil of pipe beneath said crock and connected to said first coil and a helical coil of pipe surrounding said crock and connected to said second coil and also to said reservoir.

4. In an urn of the class described, the combination of a coffee-crock, a main body-portion inclosing said crock and adapted to contain hot water and to be placed over a burner, a water tank or reservoir surrounding said body-portion, a supply pipe for said reservoir, a coil of pipe beneath said body portion and connected to said reservoir, a second coil of pipe beneath said crock and connected to said first coil, a helical coil of pipe surrounding said crock and connected to said second coil and also to said reservoir, receptacles for rolls arranged beneath said first-mentioned coil and sprayer pipes connected to said coil and leading into said receptacles.

5. In an urn of the class described, the combination of a main body-portion provided with a base-section, a coffee-crock supported within said body portion, a water reservoir surrounding said body-portion, a burner in said base-section, receptacles for rolls or the like, surrounding said burner, a coil of pipe adjacent said burner and connected to said reservoir, sprayer pipes in said receptacles and connected to said coil, a second coil adjacent to said crock and connections therefrom to said reservoir, means to supply cold water to said reservoir and means to withdraw the hot water therefrom.

6. In an urn of the class described, the combination of a coffee-crock, a main body-portion inclosing said crock and adapted to contain hot water and to be placed over a burner, a water tank or reservoir surrounding said body-portion, a circulation pipe connected at both ends to said reservoir and being formed into an intermediate coil beneath said body-portion and also into a second coil surrounding said crock, and a support attached to the outside of said reservoir to hold an inverted bottle in close proximity to the wall of said reservoir, and constructed and adapted to enable the contents of the bottle to be drawn off as desired.

In testimony whereof I affix my signature, in presence of two witnesses.

DANIEL O'CONNELL DOWE.

Witnesses:
 ED. C. FOWLER,
 J. K. JACKSON.